Inventor:
John C. Schelleng
by ⎯⎯⎯ Atty.

Patented Aug. 20, 1929.

1,724,968

UNITED STATES PATENT OFFICE.

JOHN C. SCHELLENG, OF MILLBURN, NEW JERSEY, ASSIGNOR TO WESTERN ELECTRIC COMPANY, INCORPORATED, OF NEW YORK, N. Y., A CORPORATION OF NEW YORK.

REGULATOR FOR RECTIFIERS.

Application filed November 19, 1924. Serial No. 750,890.

This invention relates to electrical apparatus and more particularly to a method of and means for effecting voltage regulation in rectifier systems.

One object of the invention is to prevent the voltage at no load from rising to an excessive value.

Another object is to improve the voltage regulation of rectifier systems between no load and full load.

These objects and others which will be apparent as the nature of the invention is disclosed are accomplished by employing, in a rectifier circuit, a regulator comprising a plurality of magnetic circuits having a common portion carrying two windings, one of which is included in the alternating current supply circuit to impede the flow of current, and thereby prevent the no-load voltage impressed on the rectifier rising to an excessive value. The other winding is included in the rectifier current or load circuit and cooperates with the first winding to control the impedance effect of the first winding by increasing the flux density of the core under conditions of load. As the load current is increased, the impedance offered to the flow of alternating current is gradually reduced until at some definite value of load current, the core becomes magnetically saturated, after which the impedance offered by the first winding becomes so small that its effect upon the voltage supplied to the rectifiers is substantially negligible.

The novel features and combinations which are believed to be characteristic of this invention will be pointed out with particularity in the claim appended hereto. The invention itself, however, both as to the details of its organization and its mode of operation will be best understood by reference to the following description taken in connection with the accompanying drawing in which:

Figure 1:
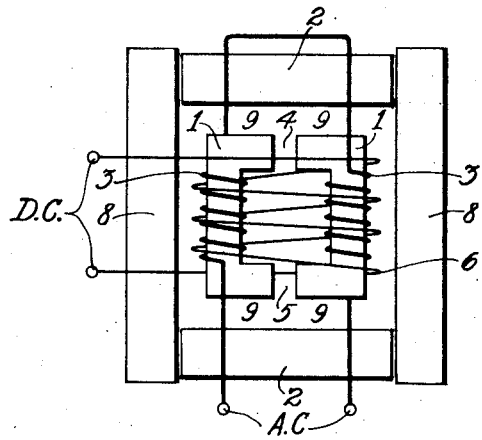
Fig. 1 is a diagrammatic representation of the regulator.

Referring to Fig. 1, there is shown a regulator having a core of magnetic material consisting of two U-shaped members spaced apart to provide air gaps 4, 5. The U-shaped members are each provided with a winding 3 which are connected in series with each other to produce a flux therein. The value of this flux is determined in part by the reluctance of the magnetic circuit comprising the U-shaped core sections and air gaps 4 and 5, the lengths of which are adjustable.

A coil 6 is wound upon the core so as to enclose both main portions of the U-shaped members 1 and the winding 3.

Surrounding the core is a closed rectangular yoke of magnetic material consisting of side members 8 and end members 2. The core is spaced apart from the yoke to provide air gaps 9 and these two elements cooperate to constitute a shell type magnetic structure. The flux produced by a current in winding 6 flows through the core, air gaps 9 and the two side members 8 in parallel. The reluctance of this magnetic circuit may be varied by adjusting the air gaps 9. For this purpose, end members 2 of the yoke are adjustably connected to the side members 8.

The flux, due to current in coil 6 is superposed upon that produced in the core by the current traversing the coil 3 and operates to reduce the impedance to the flow of alternating current through the coil 3. As the current in coil 6 increases, the flux thereby produced in the core gradually increases in a manner such that the impedance to alternating current in coil 3 gradually decreases, as described below, whereby the rectified voltage impressed upon the load circuit remains substantially constant.

Figure 2:
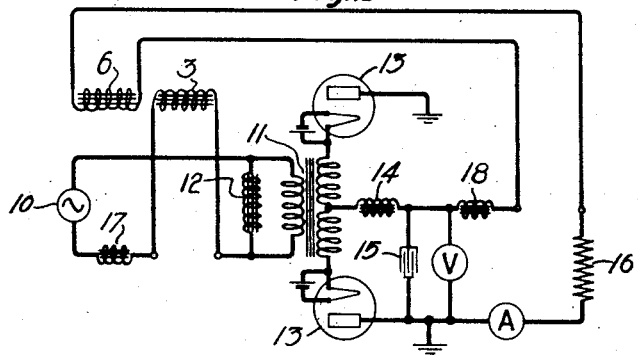
Fig. 2 shows a rectifying circuit including the regulator.

Fig. 2 illustrates a system for rectifying alternating current which includes the regulator of Fig. 1. Alternating current from the source 10 is supplied to the primary winding of the transformer 11 through a circuit including the winding 3 of the regulator and a choke coil 17. Connected in shunt to the transformer primary is a choke coil 12 for a purpose to be described later. Both half cycles of the alternating current induced in the secondary winding of the transformer 11 are rectified by the devices 13, herein shown as two electrode space discharge devices.

The rectified current is supplied through a circuit including the series connected choke coils 14, 18 and winding 6 of the regulator of Fig. 1 to a load circuit, herein shown as a resistance 16. Choke coil 14 cooperates with the shunt condenser 15 to smooth out any ripples in the rectified current.

As is well known, discharge device 13 being asymmetrically conducting, rectified current impulses will pass from the anodes of the respective devices 13 to their cathodes, but not in the reverse direction. The successive half cycles of the current induced in the secondary of transformer 11 will flow through the devices 13 alternately, so that the current supplied to the load 16 will always flow in the same direction. A voltmeter and ammeter are connected in this circuit in the usual manner to indicate the voltage and current supplied to the load.

Figure 3:
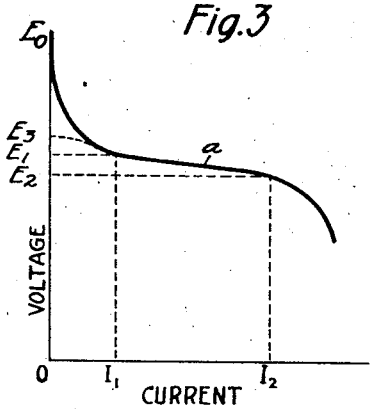
Fig. 3 is a curve to be used in explanation of the operation of the device.

In Fig. 3, curve $a$ illustrates the conditions which obtain in the well known rectifying systems which include a series choke coil and shunt condenser for smoothing out ripples in the rectifier current. This curve represents the relation of the rectified voltage impressed upon the load circuit as a function of the current flowing therein.

When no current is being drawn by load 16, the reading of the D. C. voltmeter will be equal to half the peak voltage of the secondary of transformer 11. This is represented by the point $E_0$ on curve $a$.

When current $I_1$ is supplied to the load 16, the voltage will drop to some such point, as $E_1$. This is due to choking effect of the series choke coil acting to smooth out the variations in the rectified current, and the voltmeter reading is substantially equal to the mean voltage across the secondary.

When a larger current $I_2$, at or near full load is drawn, because of the losses and voltage drop in the system, the voltage will drop to some point $E_2$ which is slightly lower than $E_1$.

In the system including the regulator described above, alternating current supplied by the source 10 traverses coil 3. This coil, connected in series with the primary of the transformer 11, will offer to the flow of alternating current from the source 10 a high impedance which will reduce the potential induced in the secondary circuit, and hence lower the rectified voltage impressed across the load circuit to some point $E_3$. The impedance of coil 3 may be regulated by adjusting the air-gaps 4 and 5, as above set forth, until the no-load voltage $E_3$ has a value substantially equal to $E_1$. The choke coil 12, connected in parallel with the primary of transformer 11, cooperates therewith to produce a proper impedance ratio between the coil 3 and the transformer primary, whereby the voltage supplied to the primary of transformer 11 may be regulated to produce the required rectified voltage $E_3$.

While, in order to disclose the more general case, the arrangement described above includes a choke coil connected in shunt to the primary of the transformer 11 to regulate its impedance relatively to that of the coil 3, it may be stated that its use is not essential to the operation of the system. As a matter of fact, the regulator and transformer could be designed to establish the desired impedance relation, in which case the coil 12 could be dispensed with.

Coil 6, the outer winding on the central leg of the magnetic structure is connected in the direct current circuit of the rectifier in series with load 16. Load current flowing through the coil 6 will produce a magnetomotive force in the central leg of the magnetic structure which will be superposed upon that produced by coil 3. The value of the flux produced by coil 6 may be controlled by adjusting the end members 2 of the yoke relatively to its side members 8 to vary the lengths of the air-gaps 9. As the load circuit increases, the total flux density in the core will be correspondingly increased, due to the current in coils 3 and 6. Although the device has been shown as including gaps 4, 5 and 9, it could obviously be so designed that the magnetic circuits would be of the proper reluctance without the use of air gaps.

Core members 1 are operated near the saturation point for no load current and hence an increase in flux will tend to saturate the core and reduce the impedance of coil 3, decreasing the effect thereof on the potential applied to transformer 11. As the load current is increased, its voltage tends to decrease, but this tendency is counteracted by the decreased impedance of coil 3. Due to these two opposite influences, the voltage will remain substantially constant until the point of saturation is reached when the impedance of coil 3 will become substantially zero and the voltage of the load current will follow the regulation curve "$a$".

From the preceding description, it will be seen that this invention provides a simple arrangement for preventing the voltage impressed upon a circuit from attaining an excessive value under no load conditions, which also operates to maintain substantially constant the voltage impressed upon the circuit for all values of current from no load to full load.

By using additional regulators, similar to that described above, this invention may be applied to systems employing any amount of power.

Although the invention has been shown and described as embodied in specific apparatus and in order to completely and clearly disclose its principles, it is to be understood that this invention is of general application and hence is not to be limited to the specific details disclosed.

What is claimed is:

In a rectifier system including alternating current and rectified current circuits, a voltage regulator comprising a pair of magnetic circuits, one of said magnetic circuits having two parallel series portions, and the other being interlinked therewith whereby its magnetic flux is divided equally between said parallel series portions, a winding on said first mentioned circuit divided equally between said parallel series portions and being included in the rectifier alternating current circuit, a second winding embracing both of said parallel series portions, said second winding being included in the rectified current circuit of the system, whereby the impedance of said alternating current winding is varied in accordance with the strength of the rectified current, and adjustable air gaps included in each of said magnetic circuits whereby the inductance of said first winding and the saturating effect of said second winding may be independently adjusted.

In witness whereof, I hereunto subscribe my name this 11th day of November, A. D. 1924.

JOHN C. SCHELLENG.